(12) United States Patent
Park

(10) Patent No.: US 8,054,718 B2
(45) Date of Patent: Nov. 8, 2011

(54) WRITE-ONCE OPTICAL DISC, AND METHOD AND APPARATUS FOR RECORDING MANAGEMENT INFORMATION THEREON

(75) Inventor: Yong Cheol Park, Gwachon-si (KR)

(73) Assignee: LG Electronics Inc., Seoul (KR)

( * ) Notice: Subject to any disclaimer, the term of this patent is extended or adjusted under 35 U.S.C. 154(b) by 346 days.

(21) Appl. No.: 12/348,030

(22) Filed: Jan. 2, 2009

(65) Prior Publication Data

US 2009/0122668 A1      May 14, 2009

Related U.S. Application Data

(63) Continuation of application No. 10/887,904, filed on Jul. 12, 2004, now Pat. No. 7,573,792.

(30) Foreign Application Priority Data

Jul. 15, 2003   (KR) ........................ 10-2003-0048279

(51) Int. Cl.
    *G11B 5/09*   (2006.01)
(52) U.S. Cl. ................ 369/47.22; 369/275.2; 369/53.31
(58) Field of Classification Search ............... 369/47.22, 369/275.2, 275.3, 275.1, 47.27, 47.14, 59.25, 369/47.23, 53.21, 53.36; 711/112
See application file for complete search history.

(56) References Cited

U.S. PATENT DOCUMENTS

| | | |
|---|---|---|
| 4,558,446 A | 12/1985 | Banba et al. |
| 4,733,386 A | 3/1988 | Shimoi et al. |
| 4,807,205 A | 2/1989 | Picard et al. |
| 4,963,866 A | 10/1990 | Duncan |
| 5,068,842 A | 11/1991 | Naito et al. |
| 5,111,444 A | 5/1992 | Fukushima et al. |
| 5,210,734 A | 5/1993 | Sakurai et al. |
| 5,235,585 A | 8/1993 | Bish et al. |
| 5,237,553 A | 8/1993 | Fukushima et al. |
| 5,247,494 A | 9/1993 | Ohno et al. |
| 5,319,626 A | 6/1994 | Ozaki et al. |
| 5,404,357 A | 4/1995 | Ito et al. |
| 5,426,624 A | 6/1995 | Goto |
| 5,442,611 A | 8/1995 | Hosaka et al. |
| 5,448,728 A | 9/1995 | Takano et al. |

(Continued)

FOREIGN PATENT DOCUMENTS

CN      1134017 A      10/1996

(Continued)

OTHER PUBLICATIONS

JIS handbook data processing for hardware, Japan, Japapnese Standards Association Inc., Apr. 21, 1999, pp. 1064-1070.

(Continued)

*Primary Examiner* — Ali Neyzari
(74) *Attorney, Agent, or Firm* — Birch, Stewart, Kolasch & Birch, LLP

(57) ABSTRACT

A write-once optical recording medium and a method and apparatus for recording management information on the recording medium, are provided. The recording medium includes at least one recording layer and SRR information on the recording layer. The SRR information pertains to at least one SRR and includes a header, an SRR entry list, and a terminator. The SRR entry list includes a plurality of SRR entries, each of the SRR entries pertaining to an SRR and including at least one status area for storing therein session start information.

26 Claims, 8 Drawing Sheets

U.S. PATENT DOCUMENTS

| | | |
|---|---|---|
| 5,475,820 A | 12/1995 | Natrasevschi et al. |
| 5,481,519 A | 1/1996 | Hosoya |
| 5,495,466 A | 2/1996 | Dohmeier et al. |
| 5,528,571 A | 6/1996 | Funahashi et al. |
| 5,553,045 A | 9/1996 | Obata et al. |
| 5,555,537 A | 9/1996 | Imaino et al. |
| 5,577,194 A | 11/1996 | Wells et al. |
| 5,608,715 A | 3/1997 | Yokogawa et al. |
| 5,666,531 A | 9/1997 | Martin |
| 5,715,221 A | 2/1998 | Ito et al. |
| 5,720,030 A | 2/1998 | Kamihara et al. |
| 5,732,053 A | 3/1998 | Yano et al. |
| 5,740,435 A | 4/1998 | Yamamoto et al. |
| 5,745,444 A | 4/1998 | Ichikawa et al. |
| 5,799,212 A | 8/1998 | Ohmori et al. |
| 5,802,028 A | 9/1998 | Igarashi et al. |
| 5,805,536 A | 9/1998 | Gage et al. |
| 5,825,726 A | 10/1998 | Hwang et al. |
| 5,848,038 A | 12/1998 | Igarashi et al. |
| 5,860,088 A | 1/1999 | Benhase et al. |
| 5,862,117 A | 1/1999 | Fuentes et al. |
| 5,867,455 A | 2/1999 | Miyamoto et al. |
| 5,878,020 A | 3/1999 | Takahashi et al. |
| 5,914,928 A | 6/1999 | Takahashi et al. |
| 5,940,702 A | 8/1999 | Sakao et al. |
| 6,058,085 A | 5/2000 | Obata et al. |
| 6,118,608 A | 9/2000 | Kakihara et al. |
| 6,138,203 A | 10/2000 | Inokuchi et al. |
| 6,160,778 A | 12/2000 | Ito et al. |
| 6,189,118 B1 | 2/2001 | Sasaki et al. |
| 6,208,602 B1 | 3/2001 | Frank |
| 6,233,654 B1 | 5/2001 | Aoki et al. |
| 6,292,445 B1 | 9/2001 | Ito et al. |
| 6,341,109 B1 | 1/2002 | Kayanuma et al. |
| 6,341,278 B1 | 1/2002 | Yamamoto et al. |
| 6,373,800 B1 | 4/2002 | Takahashi et al. |
| 6,405,332 B1 | 6/2002 | Bando et al. |
| 6,414,923 B1 | 7/2002 | Park et al. |
| 6,418,100 B1 | 7/2002 | Park et al. |
| 6,447,126 B1 | 9/2002 | Hornbeck |
| 6,466,532 B1 | 10/2002 | Ko et al. |
| 6,469,978 B1 | 10/2002 | Ohata et al. |
| 6,477,126 B1 | 11/2002 | Park et al. |
| 6,480,446 B1 | 11/2002 | Ko et al. |
| 6,493,301 B1 | 12/2002 | Park et al. |
| 6,496,807 B1 | 12/2002 | Inokuchi et al. |
| 6,529,458 B1 | 3/2003 | Shin et al. |
| 6,542,450 B1 | 4/2003 | Park et al. |
| 6,564,345 B1 | 5/2003 | Kim et al. |
| 6,581,167 B1 | 6/2003 | Gotoh et al. |
| 6,606,285 B1 | 8/2003 | Ijtsma et al. |
| 6,615,363 B1 | 9/2003 | Fukasawa et al. |
| 6,631,106 B1 | 10/2003 | Numata et al. |
| 6,633,724 B1 | 10/2003 | Hasegawa et al. |
| 6,667,939 B1 | 12/2003 | Miyamoto et al. |
| 6,671,249 B2 | 12/2003 | Horie et al. |
| 6,697,306 B2 | 2/2004 | Sako et al. |
| 6,714,502 B2 | 3/2004 | Ko et al. |
| 6,724,701 B2 | 4/2004 | Ijtsma et al. |
| 6,738,341 B2 | 5/2004 | Ohata et al. |
| 6,748,485 B1 | 6/2004 | Yokota et al. |
| 6,754,860 B2 | 6/2004 | Kim et al. |
| 6,760,288 B2 | 7/2004 | Ijtsma et al. |
| 6,763,429 B1 | 7/2004 | Hirayama et al. |
| 6,766,418 B1 | 7/2004 | Alexander et al. |
| 6,785,206 B1 | 8/2004 | Lee et al. |
| 6,785,219 B1 | 8/2004 | Sasaki et al. |
| 6,788,631 B1 | 9/2004 | Park et al. |
| 6,795,389 B1 | 9/2004 | Nishiuchi et al. |
| 6,804,797 B2 | 10/2004 | Ko et al. |
| 6,826,140 B2 | 11/2004 | Brommer et al. |
| 6,842,580 B1 | 1/2005 | Ueda et al. |
| 6,845,069 B2 | 1/2005 | Nakahara et al. |
| 6,883,111 B2 | 4/2005 | Yoshida et al. |
| 6,885,623 B1 | 4/2005 | Oishi et al. |
| 6,918,003 B2 | 7/2005 | Sasaki et al. |
| 6,934,236 B2 | 8/2005 | Lee et al. |
| 6,999,398 B2 | 2/2006 | Yamamoto et al. |
| 7,002,882 B2 | 2/2006 | Takahashi et al. |
| 7,027,059 B2 | 4/2006 | Hux et al. |
| 7,027,373 B2 | 4/2006 | Ueda et al. |
| 7,031,239 B2 | 4/2006 | Takahashi et al. |
| 7,042,825 B2 | 5/2006 | Yamamoto et al. |
| 7,050,701 B1 | 5/2006 | Sasaki et al. |
| 7,092,334 B2 | 8/2006 | Choi et al. |
| 7,092,911 B2 | 8/2006 | Yokota et al. |
| 7,123,556 B2 | 10/2006 | Ueda et al. |
| 7,149,930 B2 | 12/2006 | Ogawa et al. |
| 7,161,879 B2 | 1/2007 | Hwang et al. |
| 7,184,377 B2 | 2/2007 | Ito et al. |
| 7,188,271 B2 | 3/2007 | Park et al. |
| 7,203,139 B2 | 4/2007 | Terada et al. |
| 7,233,550 B2 | 6/2007 | Park et al. |
| 7,236,687 B2 | 6/2007 | Kato et al. |
| 7,272,086 B2 | 9/2007 | Hwang et al. |
| 7,289,404 B2 | 10/2007 | Park et al. |
| 7,296,178 B2 | 11/2007 | Yoshida et al. |
| 7,313,066 B2 | 12/2007 | Hwang et al. |
| 7,327,654 B2 | 2/2008 | Hwang et al. |
| 7,349,301 B2 | 3/2008 | Terada et al. |
| 7,379,402 B2 | 5/2008 | Ko et al. |
| 7,506,109 B2 | 3/2009 | Park |
| 7,529,171 B2 | 5/2009 | Ito et al. |
| 7,573,792 B2 * | 8/2009 | Park ........................ 369/47.22 |
| 2001/0009537 A1 | 7/2001 | Park |
| 2001/0011267 A1 | 8/2001 | Kihara et al. |
| 2001/0020261 A1 | 9/2001 | Ando et al. |
| 2001/0021144 A1 | 9/2001 | Oshima et al. |
| 2001/0026511 A1 | 10/2001 | Ueda et al. |
| 2001/0034855 A1 | 10/2001 | Ando et al. |
| 2001/0043525 A1 | 11/2001 | Ito et al. |
| 2002/0025138 A1 | 2/2002 | Isobe et al. |
| 2002/0035705 A1 | 3/2002 | Ando et al. |
| 2002/0049938 A1 | 4/2002 | Ko |
| 2002/0097665 A1 | 7/2002 | Ko et al. |
| 2002/0097666 A1 | 7/2002 | Ko et al. |
| 2002/0099950 A1 | 7/2002 | Smith |
| 2002/0136118 A1 | 9/2002 | Takahashi |
| 2002/0136134 A1 | 9/2002 | Ito et al. |
| 2002/0136537 A1 | 9/2002 | Takahashi |
| 2002/0159382 A1 | 10/2002 | Ohata et al. |
| 2002/0161774 A1 | 10/2002 | Tol et al. |
| 2002/0176341 A1 | 11/2002 | Ko et al. |
| 2002/0186341 A1 | 12/2002 | Yamamura et al. |
| 2003/0072236 A1 | 4/2003 | Hirotsune et al. |
| 2003/0095482 A1 | 5/2003 | Hung et al. |
| 2003/0126527 A1 | 7/2003 | Kim et al. |
| 2003/0133369 A1 | 7/2003 | Sasaki |
| 2003/0135800 A1 | 7/2003 | Kim et al. |
| 2003/0137909 A1 | 7/2003 | Ito et al. |
| 2003/0137910 A1 | 7/2003 | Ueda et al. |
| 2003/0137913 A1 | 7/2003 | Oshima et al. |
| 2003/0142608 A1 | 7/2003 | Yamamoto et al. |
| 2003/0149918 A1 | 8/2003 | Takaichi |
| 2003/0161239 A1 | 8/2003 | Yamawaki |
| 2003/0173669 A1 | 9/2003 | Shau |
| 2003/0198155 A1 | 10/2003 | Go et al. |
| 2004/0001408 A1 | 1/2004 | Propps et al. |
| 2004/0004917 A1 | 1/2004 | Lee |
| 2004/0047616 A1 | 3/2004 | Uchiumi et al. |
| 2004/0057363 A1 | 3/2004 | Tsukihashi et al. |
| 2004/0062159 A1 | 4/2004 | Park et al. |
| 2004/0062160 A1 | 4/2004 | Park et al. |
| 2004/0076096 A1 | 4/2004 | Hwang et al. |
| 2004/0090888 A1 | 5/2004 | Park et al. |
| 2004/0105363 A1 | 6/2004 | Ko et al. |
| 2004/0114474 A1 | 6/2004 | Park et al. |
| 2004/0120233 A1 | 6/2004 | Park et al. |
| 2004/0125716 A1 | 7/2004 | Ko et al. |
| 2004/0125717 A1 | 7/2004 | Ko et al. |
| 2004/0136292 A1 | 7/2004 | Park et al. |
| 2004/0145980 A1 | 7/2004 | Park et al. |
| 2004/0158768 A1 | 8/2004 | Park et al. |
| 2004/0160799 A1 | 8/2004 | Park et al. |
| 2004/0165495 A1 | 8/2004 | Park et al. |
| 2004/0174782 A1 | 9/2004 | Lee et al. |
| 2004/0174785 A1 | 9/2004 | Ueda et al. |

| | | | | | | | |
|---|---|---|---|---|---|---|---|
| 2004/0179445 | A1 | 9/2004 | Park et al. | JP | 2-54327 | A | 2/1990 |
| 2004/0179458 | A1 | 9/2004 | Hwang et al. | JP | 3-46184 | A | 2/1991 |
| 2004/0193946 | A1 | 9/2004 | Park et al. | JP | 05-274814 | A | 10/1993 |
| 2004/0223427 | A1 | 11/2004 | Kim et al. | JP | 6-20449 | A | 1/1994 |
| 2004/0246851 | A1 | 12/2004 | Hwang et al. | JP | 6-309802 | A | 11/1994 |
| 2005/0007910 | A1 | 1/2005 | Ito et al. | JP | 06-349201 | A | 12/1994 |
| 2005/0008346 | A1 | 1/2005 | Noguchi et al. | JP | 7-168749 | A | 7/1995 |
| 2005/0025007 | A1 | 2/2005 | Park | JP | 7-220400 | A | 8/1995 |
| 2005/0047294 | A1 | 3/2005 | Park | JP | 08-096522 | A | 4/1996 |
| 2005/0050402 | A1 | 3/2005 | Koda et al. | JP | 8-147702 | A | 6/1996 |
| 2005/0052972 | A1 | 3/2005 | Park | JP | 8-273162 | A | 10/1996 |
| 2005/0052973 | A1 | 3/2005 | Park | JP | 8-287595 | A | 11/1996 |
| 2005/0055500 | A1 | 3/2005 | Park | JP | 9-45004 | A | 2/1997 |
| 2005/0060489 | A1 | 3/2005 | Park | JP | 09-145634 | A | 6/1997 |
| 2005/0068877 | A1 | 3/2005 | Yeo | JP | 09-231053 | A | 9/1997 |
| 2005/0083740 | A1 | 4/2005 | Kobayashi | JP | 9-270175 | A | 10/1997 |
| 2005/0083767 | A1 | 4/2005 | Terada et al. | JP | 9-282849 | A | 10/1997 |
| 2005/0083830 | A1 | 4/2005 | Martens et al. | JP | 9-288884 | A | 11/1997 |
| 2005/0157619 | A1 | 7/2005 | Miyawaki et al. | JP | 10-49991 | A | 2/1998 |
| 2005/0195716 | A1 | 9/2005 | Ko et al. | JP | 10-050005 | A | 2/1998 |
| 2005/0207262 | A1 | 9/2005 | Terada et al. | JP | 10-050032 | A | 2/1998 |
| 2005/0289389 | A1 | 12/2005 | Yamagami et al. | JP | 10-187356 | | 7/1998 |
| 2006/0077827 | A1 | 4/2006 | Takahashi | JP | 10-187357 | | 7/1998 |
| 2006/0136134 | A1 | 6/2006 | Mihara | JP | 10-187358 | | 7/1998 |
| 2006/0195719 | A1 | 8/2006 | Ueda et al. | JP | 10-187359 | | 7/1998 |
| 2006/0203635 | A1 | 9/2006 | Ko et al. | JP | 10-187360 | | 7/1998 |
| 2006/0203638 | A1 | 9/2006 | Ko et al. | JP | 10-187361 | A1 | 7/1998 |
| 2006/0203684 | A1 | 9/2006 | Ko et al. | JP | 10-199154 | A | 7/1998 |
| 2006/0227694 | A1 | 10/2006 | Woerlee et al. | JP | 11-110888 | A | 4/1999 |
| 2006/0280076 | A1 | 12/2006 | Bondijk | JP | 11-203792 | A | 7/1999 |
| 2007/0294571 | A1 | 12/2007 | Park et al. | JP | 2000-090588 | A | 3/2000 |
| 2008/0046780 | A1 | 2/2008 | Shibuya et al. | JP | 2000-149449 | A | 5/2000 |
| | | | | JP | 2000-195178 | A | 7/2000 |

FOREIGN PATENT DOCUMENTS

| | | | |
|---|---|---|---|
| CN | 1140897 | C | 1/1997 |
| CN | 1214147 | A | 4/1999 |
| CN | 1227950 | A | 9/1999 |
| CN | 1273419 | A | 11/2000 |
| CN | 1675708 | A | 9/2005 |
| CN | 1685426 | A | 10/2005 |
| DE | 199 54 054 | A1 | 6/2000 |
| EP | 0314186 | A2 | 5/1989 |
| EP | 0325823 | A1 | 8/1989 |
| EP | 0350920 | A2 | 1/1990 |
| EP | 0464811 | A2 | 1/1992 |
| EP | 0472484 | A2 | 2/1992 |
| EP | 0477503 | A2 | 4/1992 |
| EP | 0556046 | A1 | 8/1993 |
| EP | 0871172 | A2 | 10/1998 |
| EP | 0908882 | A2 | 4/1999 |
| EP | 0 971 345 | A1 | 1/2000 |
| EP | 0974967 | A1 | 1/2000 |
| EP | 0989554 | A1 | 3/2000 |
| EP | 0 997 904 | A1 | 5/2000 |
| EP | 1026681 | B1 | 8/2000 |
| EP | 1 040 937 | A1 | 10/2000 |
| EP | 1043723 | A1 | 10/2000 |
| EP | 1132914 | A2 | 9/2001 |
| EP | 1148493 | A2 | 10/2001 |
| EP | 1152414 | A2 | 11/2001 |
| EP | 1239478 | A1 | 9/2002 |
| EP | 1274081 | A2 | 1/2003 |
| EP | 1298659 | A1 | 4/2003 |
| EP | 1 321 940 | A1 | 6/2003 |
| EP | 1329888 | A1 | 7/2003 |
| EP | 1347452 | A2 | 9/2003 |
| EP | 1547065 | | 6/2005 |
| EP | 1564740 | A1 | 8/2005 |
| EP | 1573723 | | 9/2005 |
| EP | 1612790 | A1 | 1/2006 |
| EP | 1623421 | A1 | 2/2006 |
| EP | 1623422 | | 2/2006 |
| EP | 1644920 | A1 | 4/2006 |
| EP | 1658613 | A2 | 5/2006 |
| GB | 2356735 | A | 5/2001 |
| JP | 63-091842 | A | 4/1988 |
| JP | 64-79940 | A | 3/1989 |
| JP | 01-263955 | A | 10/1989 |
| JP | 02-023417 | A | 1/1990 |
| JP | 2000-215612 | | 8/2000 |
| JP | 2000-285607 | A | 10/2000 |
| JP | 2000-348057 | A | 12/2000 |
| JP | 2001-023317 | A | 1/2001 |
| JP | 2001-069440 | A | 3/2001 |
| JP | 2001-110168 | A | 4/2001 |
| JP | 2001-148166 | A | 5/2001 |
| JP | 2001-319339 | A | 11/2001 |
| JP | 2001-351334 | A | 12/2001 |
| JP | 2001-357623 | A | 12/2001 |
| JP | 2002-015507 | A | 1/2002 |
| JP | 2002-015525 | A | 1/2002 |
| JP | 2002-056619 | A | 2/2002 |
| JP | 2002-117649 | A | 4/2002 |
| JP | 2002-117652 | A | 4/2002 |
| JP | 2002-170342 | A | 6/2002 |
| JP | 2002-215612 | A | 8/2002 |
| JP | 2002-245723 | A | 8/2002 |
| JP | 2002-288938 | A | 10/2002 |
| JP | 2002-329321 | A | 11/2002 |
| JP | 2002-352522 | A | 12/2002 |
| JP | 2003-30844 | A | 1/2003 |
| JP | 2003-85882 | A | 3/2003 |
| JP | 2003-228962 | A | 8/2003 |
| JP | 2003-249029 | A | 9/2003 |
| JP | 2003-335062 | A | 11/2003 |
| JP | 2003-536194 | A | 12/2003 |
| JP | 2004-79087 | A | 3/2004 |
| JP | 2004-95057 | A | 3/2004 |
| JP | 2004-118910 | A | 4/2004 |
| JP | 2004-213769 | A | 7/2004 |
| JP | 2004-213774 | A | 7/2004 |
| JP | 2004-280864 | A | 10/2004 |
| JP | 2004-280865 | A | 10/2004 |
| JP | 2004-280866 | A | 10/2004 |
| JP | 2005-004912 | A | 1/2005 |
| JP | 2005-32374 | A | 2/2005 |
| JP | 2005-44495 | A | 2/2005 |
| JP | 2005-535993 | A | 11/2005 |
| JP | 2005-538490 | A | 12/2005 |
| JP | 2005-538491 | A | 12/2005 |
| JP | 2006-519445 | A | 8/2006 |
| JP | 2007-502512 | A | 2/2007 |
| JP | 2007-66515 | A | 3/2007 |
| KR | 1020040094301 | A | 11/2004 |
| KR | 10-2004-100702 | A | 12/2004 |

| | | | |
|---|---|---|---|
| KR | 10-2005-0109894 A | 11/2005 |
| KR | 10-2006-0052789 A | 5/2006 |
| KR | 10-2010-0072379 A | 6/2010 |
| RU | 2005 103 626 | 9/2005 |
| RU | 2005 127 337 | 2/2006 |
| TW | 283232 A | 8/1996 |
| TW | 302475 A | 4/1997 |
| TW | 371752 | 10/1999 |
| TW | 413805 | 12/2000 |
| TW | 484119 | 4/2002 |
| TW | 486913 | 5/2002 |
| TW | 495750 B | 7/2002 |
| TW | 508592 | 11/2002 |
| WO | WO-84/00628 A1 | 2/1984 |
| WO | WO-96/30902 A1 | 10/1996 |
| WO | WO-97/22182 A1 | 6/1997 |
| WO | 2000-21093 A | 1/2000 |
| WO | WO 00/19432 A1 | 4/2000 |
| WO | WO 00/54158 A1 | 9/2000 |
| WO | WO-00/54274 A1 | 9/2000 |
| WO | WO-01/22416 A1 | 3/2001 |
| WO | WO-01/75879 A1 | 10/2001 |
| WO | WO-01/93035 A2 | 12/2001 |
| WO | WO 02/086887 A1 | 10/2002 |
| WO | WO-03/007296 A1 | 1/2003 |
| WO | WO-03/025924 A1 | 3/2003 |
| WO | 2003-208779 A | 7/2003 |
| WO | WO-03/079353 A1 | 9/2003 |
| WO | WO-2004/015707 A1 | 2/2004 |
| WO | WO-2004/015708 A1 | 2/2004 |
| WO | WO-2004/025648 | 3/2004 |
| WO | WO-2004/025649 | 3/2004 |
| WO | WO-2004/029668 A2 | 4/2004 |
| WO | WO-2004/029941 A1 | 4/2004 |
| WO | WO-2004/034396 A1 | 4/2004 |
| WO | WO-2004/036561 A1 | 4/2004 |
| WO | WO-2004/053872 A1 | 6/2004 |
| WO | WO-2004/053874 A1 | 6/2004 |
| WO | WO-2004/068476 A1 | 8/2004 |
| WO | WO-2004-075180 | 9/2004 |
| WO | WO-2004-077415 A1 | 9/2004 |
| WO | WO-2004/079631 | 9/2004 |
| WO | WO-2004/079731 A1 | 9/2004 |
| WO | WO-2004/079740 A1 | 9/2004 |
| WO | WO-2004/081926 A1 | 9/2004 |
| WO | WO-2004/093035 A1 | 10/2004 |
| WO | WO-2004/100155 A1 | 11/2004 |
| WO | WO-2004/100156 A1 | 11/2004 |
| WO | WO 2004/105024 A1 | 12/2004 |
| WO | WO-2005/004123 A1 | 1/2005 |
| WO | WO-2005/004154 A2 | 1/2005 |
| WO | WO-2005/006314 A1 | 1/2005 |

OTHER PUBLICATIONS

Parlante, "Linked List Basics", Document No. 103, Apr. 12, 2001, pp. 1-26, http://cslibrary.stanford.edu/103/LinkedListBasics.pdf.

* cited by examiner

*LRA : Last Recorded Address

WRITE-ONCE OPTICAL DISC, AND METHOD AND APPARATUS FOR RECORDING MANAGEMENT INFORMATION THEREON

This application is a Continuation of application Ser. No. 10/887,904 filed on Jul. 12, 2004, now U.S. Pat. No. 7,573,792, and for which priority is claimed under U.S.C. § 120. This application claims the priority benefit of Patent Application No. 2003/48279 filed on Jul. 15, 2003 in Republic of Korea, under 35 U.S.C. § 119. The entire contents of which are hereby incorporated by reference.

BACKGROUND OF THE INVENTION

1. Field of the Invention

The present invention relates to a write-once optical disc, and a method and apparatus for recording management information on the write-once optical disc.

2. Description of the Related Art

As an optical recording medium, optical discs on which high-capacity data can be recorded are widely being used. Among them, a new high-density optical disc, for example, a Blu-ray disc, has been recently developed for recording and storing high-definition video data and high-quality audio data for a long term period.

The Blu-ray disc is the next generation HD-DVD technology and the next generation optical recording solution, and has an excellent capability to s02FDIS045US01 tore data more than an existing DVD. Recently, a technical specification of international standard for HD-DVD has been established.

The Blu-ray disc, one of the international standards for HD-DVD, uses a 405 nm blue laser, which is much denser than a 650 nm red laser used in the existing DVDs. In addition, compared to the existing DVDs, a larger quantity of data can be stored in the Blu-ray disc having a thickness of 1.2 mm and a diameter of 12 cm. Generally, the Blu-ray disc has an optical transmission layer with the thickness of 0.1 mm.

Recently, a standard relating to the Blu-ray disc is being developed. Following a rewritable Blu-ray disc (BD-RE), various standards for a write-once Blu-ray disc (BD-WO) are being prepared. Specifically, among the standards for the BD-WO, a method for recording management information has been discussed. This method involves a process of recording information indicating the used status of the write-once optical disc.

The information indicating the used status of the disc is information indicating a recorded status of the disc in order to allow a host or a user to easily find a recordable area on the write-once optical disc. In the existing write-once optical disc, this information is called differently. For example, in the case of CD series, the recorded status indicating information is called track information. In the case of DVD series, the recorded status indicating information is called an RZone, a fragment or a recording range.

FIG. 1 shows the structure of a DVD-R according to a related art. As shown in FIG. 1, the management information of the disc is recorded in a recording management data (RMD) area. The information indicating the used status of the disc is managed using RMD Fields 4 to 12 of the recording management area (RMA). There are an open RZone, an invisible RZone and a close RZone.

If the host or the like requests a recordable location to additionally record data on the DVD-R, the driver checks the recorded status indicating information (RZone information) recorded in the above-described manner and checks last recorded addresses LRAs of first and second open RZones and transmits generally the location "LRA+1" as the recordable location to the host. The recordable location is called a "next writable address" (NWA). Due to the transmitted NWA information, the host or the like is allowed to validly perform the additional recording on the disc.

However, since the existing DVD-R and other disc types are different from a write-once Blu-ray disc (BD-WO) in their physical structure and use environment, the conventional method of providing the management information cannot be applied to the BD-WO. In case of the BD-WO, a driver manages disc defects, but the BD-WO is required to have a special additional area for the driver to manage the defects. The BD-WO, thus, has a complex disc structure and as a result, the method of managing the recorded status indicating information of the DVD-R cannot be used for the BD-WO.

Accordingly, there is a need for a method of efficiently recording management information corresponding to the used status of a high density write-once optical disc such as a BD-WO, so that the disc can be accessed easily and used more effectively. And such management information should be structured to ensure compatibility with the overall structure, use and standards of the BD-WO. In addition, there is a demand for a method of recording management information on a disc, which can be applied to other write-once high-density optical discs performing defect management, as well as to the above Blu-ray discs.

SUMMARY OF THE INVENTION

Accordingly, the present invention is directed to a write-once optical disc, and a method and apparatus for recording management information on the disc, which substantially obviate one or more problems due to limitations and disadvantages of the related art.

An object of the present invention is to provide a write-once optical disc and a method and apparatus for recording management information on the write-once optical disc, in which information on the used status of the disc is recorded and managed efficiently.

Another object of the present invention is to provide a write-once optical disc, and a method and apparatus for recording track information on the disc, in which the track information is recorded as the information on the used status of the disc. The method and apparatus of the present invention are applicable to a write-once optical disc in which physical defect management is performed.

Another object of the present invention is to provide a write-once optical disc, and a method and apparatus for recording track information, in which session information is recorded without any allocation of an additional physical area within the disc. In addition, the compatibility with the existing reproduction-only standard can be secured.

A still further object of the present invention is to provide a method and apparatus for efficiently updating track information.

According to an aspect, the present invention provides a recording medium having at least one recording layer, the recording medium comprising: a session including at least one recording-unit; and sequential recording information on the at least one recording layer, the sequential recording information pertaining to the at least one recording-unit and including a recording-unit entry list, the recording-unit entry list including at least one recording-unit entry, wherein the at least one recording-unit entry pertains to the at least one recording-unit respectively and includes at least one status area to store session start information indicating whether the corresponding recording-unit is a start of the session.

According to another aspect, the present invention provides a recording medium comprising: at least one recording layer; and at least one SRR entry stored on the at least one recording layer, each SRR entry pertaining to an SRR and including at least one status area, the at least one status area storing therein session start information and being allocated at the corresponding SRR entry excluding beginning bits of the corresponding SRR entry.

According to another aspect, the present invention provides a method for recording management information on a recording medium having at least one recording layer, the method comprising: (a) recording a sequential recording information on the at least one recording layer, the sequential recording information pertaining to at least one recording-unit and including a recording-unit entry list, the recording-unit entry list including at least one recording-unit entry, the at least one recording-unit entry pertaining to the at least one recording-unit respectively, wherein the at least one recording-unit forms a session and the at least one recording-unit entry includes at least one status area to store session start information indicating whether the corresponding recording-unit is a start of the session.

According to another aspect, the present invention provides a method for recording management information on a recording medium having at least one recording layer, the method comprising: (a) recording at least one entry on the at least one recording layer, each SRR entry pertaining to an SRR and including at least one status area for storing therein session start information, each SRR entry being allocated at the corresponding SRR entry excluding beginning bits of the corresponding SRR entry.

According to another aspect, the present invention provides an apparatus for recording management information on a recording medium having at least one recording layer, the apparatus comprising: a recording/reproducing part for recording a sequential recording information on the at least one recording layer, the sequential recording information pertaining to at least one recording-unit and including a header, a recording-unit entry list, and a terminator, the recording-unit entry list including a plurality of recording-unit entries, each of the recording-unit entries pertaining to a recording-unit and including at least one status area for storing therein session start information.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Figure 1:
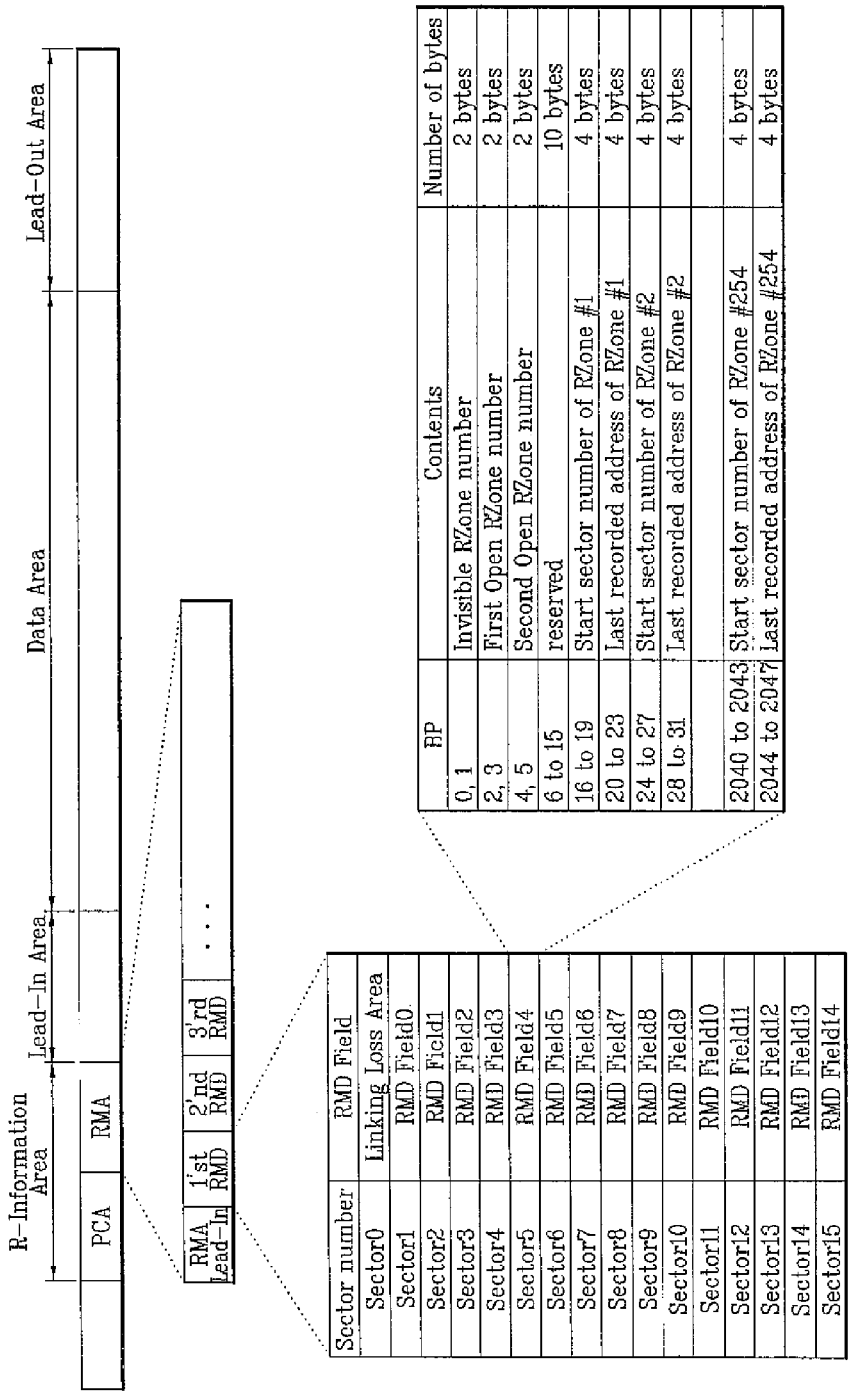
FIG. 1 schematically shows a structure of a DVD-R disc according to a related art.

Reference will now be made in detail to the preferred embodiments of the present invention, examples of which are illustrated in the accompanying drawings. Wherever possible, the same reference numerals will be used throughout the drawings to refer to the same or like parts.

Although the most widely used and general terms are chosen, terms arbitrarily chosen by the present inventor(s) are also used. In such cases, the present invention should be understood in view of the meanings of the terms as defined by the inventor(s). In this regard, the present inventor(s) define the term "track" to mean a sequential recording range (SRR) of a write-once optical disc such as a BD-WO, i.e., an area for recording data/information on the disc. As such, "track" and "SRR" are used interchangeable herein and each represents a unit of recording (a recording-unit). Consequently, the term "track information" ("Track-Info") or "SRR information" (SRRI) is defined by the present inventor(s) as a general term that indicates a used status of the write-once optical disc. A session has at least one track/SRR, i.e., at least one recording-unit. The term "session information" is used as a general term for indicating a recorded status of a specific block in order for the compatibility with a reproduction-only standard.

The present invention provides a method and apparatus for recording track information applicable to a new high-density optical disc. The invention records session information within the track information without any allocation of an additional physical area. In addition, the invention does not limit the number of used open tracks and supports the maximum sixteen tracks. Therefore, compared to the related art in which the maximum two open tracks (in case of the DVD-R, "RZone") exist, this invention utilizes the disc more efficiently and provides an optimum structure of the track information suitable for such disc management.

Figure 2:
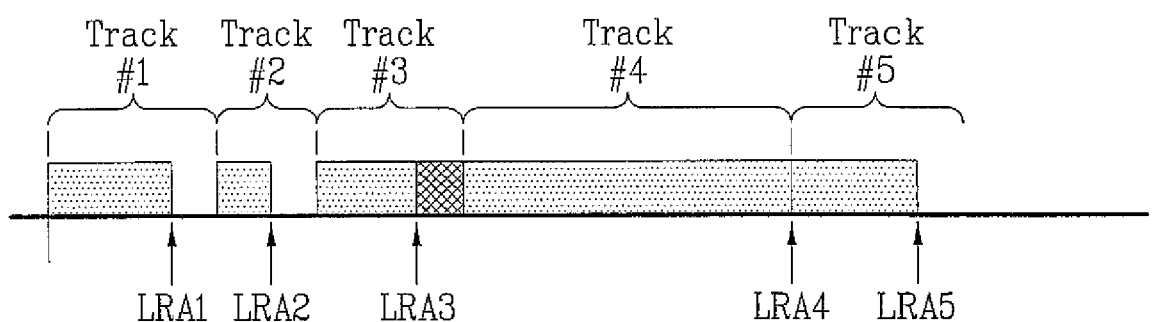
FIG. 2 shows an example of different types of tracks of a write-once optical disc applicable to the present invention.

FIG. 2 illustrates different types of tracks on a write-once optical disc such as a BD-WO, which are applicable to the present invention. As shown, the disc is divided into a plurality of tracks. In this example, each of Tracks #1 and #2 is an "open track" in which an additionally recordable area remains in the track. Each of Tracks #3 and #4 is a "closed track" or a "complete track" in which an additional recording is impossible because the track is fully filled. The last track, Track #5, is an "intermediate track" in which an additional recording is always possible.

The closed tracks, Tracks #3 and #4, in which additional recording is impossible, begin as open tracks. As any remaining available area of Tracks #3 and #4 is zero-padded due to a specific command (e.g., a close command from the host), the status of the tracks is changed into the closed tracks after the zero padding (hatched portion). In this example, the remaining available area of Track #3 is zero-padded before the track is closed. In some cases, when an open track is changed into a closed track according to a close command, it is possible to change only the information on the type of the track without the zero padding.

Each track includes a "start PSN of track" and also includes always a "Last Recorded Address" (LRA) without regard to the type of the track. The PSN is a physical sector number and is a general term indicating information on a specific location of the disc. In addition, the LRA is the last address in which data is actually recorded. Therefore, in case of Track #3, the location just before the zero padding becomes the LRA (LRA3). In more detail, in case a recording-unit is a cluster, e.g., in a BD-WO, a total of 32 sectors exist in one cluster. In this case, if data is recorded on some sectors within one cluster and the remaining sectors are zero padded, the location prior to the zero padding becomes the LRA.

Further, a next writable address (NWA) calculated from the LRA is determined only at the open tracks (Tracks #1 and #2) and the intermediate track (Track #5) by a request of the host or the like and then the calculated NWA information is transmitted appropriately, e.g., to the host. Since additional recording is impossible at the closed tracks (Tracks #3 and #4), there is no NWA for Tracks #3 and #4 in this example.

The present invention provides schemes of indicating various types of tracks as shown in FIG. 2 and indicating session information associated with the tracks. This will be explained by referring to FIGS. 3-6.

Figure 3:
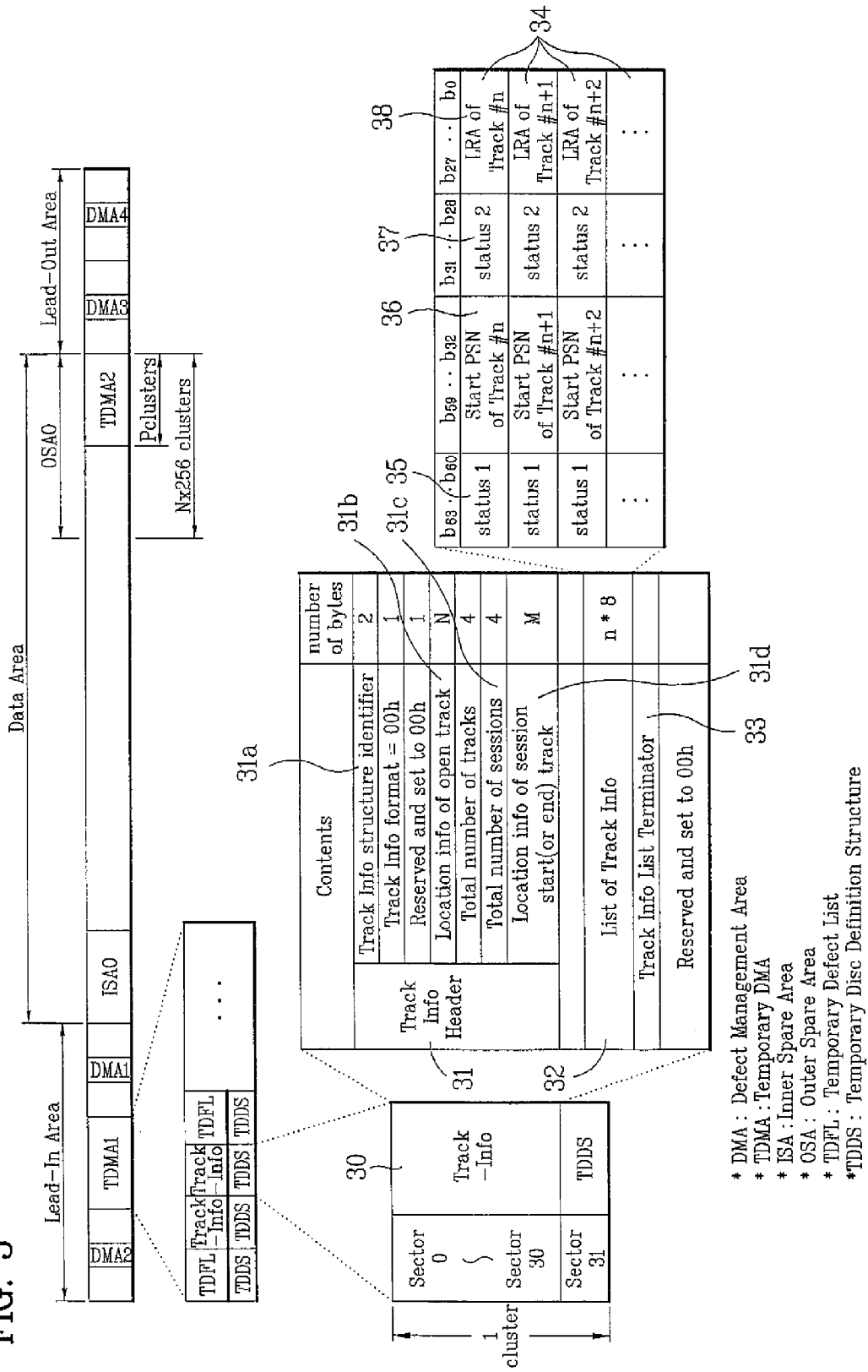
FIG. 3 illustrates a structure of a write-once optical disc and a method for recording disc management information on the write-once optical disc according to embodiments of the present invention.

FIG. 3 illustrates the structure of a write-once optical disc such as a BD-WO and a method of recording management information on the disc according to various embodiments of the present invention. The write-once optical disc of FIG. 3 relates to a single layer disc having only one recording layer. However, the present invention is not limited to such and the disc structures and methods of the present invention are equally applicable to a multi-layer disc such as a dual layer disc.

As shown in FIG. 3, the disc includes a lead-in area, a data area and a lead-out area. Inner and outer spare areas ISA0 and OSA0 for replacing defective areas in order to manage physical defects are provided in the data area. Defect management areas DMA1~DMA4 are provided in the lead-in and lead-out areas. A first temporary defect management area TDMA1 is provided in the lead-in area, and a second temporary defect management area TDMA2 is provided in the outer spare area OSA0. The TDMAs store defect management information temporarily, while the DMAs store the defect management information permanently. When the data area cannot be recorded any more or the disc is to be finalized, the information stored in the final TDMA is transferred to at least one DMA. Generally, each DMA stores the same information so that if one DMA fails or has defects, important management information is not lost and can be retrieved from the other DMAs. In general, in case of a rewritable optical disc, only a defect management area (DMA) of a limited size is provided because it is possible to repeatedly write/erase data to/from the DMA. Thus, the DMA of a larger size is not needed. However, in case of the write-once optical disc such as a BD-WO, an area where the data are recorded once cannot be used for rewriting. Therefore, for a write-once optical disc, a DMA of a larger size is needed for the defect management.

The TDMA1 is allocated with a fixed size in the lead-in area and the TDMA2 is allocated with a size varying according to the size of the outer spare area OSA0. For example, if the size of the OSA0 is (N×256) clusters where N is a positive integer, then the size (P) of the OSA0 can be: P=(N×256)/4 clusters).

A temporary defect list information (TDFL) and a temporary disc definition structure information (TDDS) together can be recorded on each TDMA as one recording-unit (in case of the DB-WO, one cluster). Track information (Track-Info) of the disc and the TDDS can be also recorded together as one recording-unit. The TDMA can have one or more of such recording-units.

Here, if a defect occurs within the data area, a process of replacing the defective area with the spare area is carried out, and the management information associated with this process is stored as the TDFL. In case of a single layer disc, the TDFL is recorded with the size of 1 cluster to 3 clusters according to the size of the defect list.

Track-Info (or SRRI) is disc status information that indicates whether or not a specific area of the disc has been recorded. Specifically, Track-Info can be used to cases where the disc has a sequential or incremental recording. As shown in FIG. 3, one cluster of the TDMA can include Track-Info at Sectors 0-30, and a TDDS at Sector 31. But it is also possible to record the TDDS at the first sector (Sector 0) and to record Track-Info at the remaining sectors of the cluster.

The structure of the track information (Track-Info) 30 in FIG. 3 will be now described in detail. First, the track information 30 generally includes three parts: (a) a header (31) for making the track information identifiable, (b) a list of track information (32) for directly indicating the track information, and (c) a track information list terminator (33) for indicating the termination of the track information.

The header ("Track Info Header") 31 is located at the head of the Track-Info 30 and includes a "Track Info structure Identifier" field 31a for making the track information identifiable, a "Location info of open track" field 31b for indicating a location of the open track(s) existing within the corresponding track information, a "Total number of sessions" field 31c for indicating the total number of sessions, and a "Location info of session start (or end) track" field 31d for indicating a location of the start or end track of the session(s). Therefore, it is possible to check the contents of the overall track information before the track information list is directly read out. As a result, it is possible to newly define and standardize necessary information in the header, except for the above fields.

The list of track information ("List of Track Info") 32 is recorded next to the header 31. If the list of track information is terminated, the track information list terminator ("Track Info List Terminator") 33 indicates the termination of the track information. Specifically, the track information list terminator is a meaningful information indicating the termination location of the corresponding track information in case the track information is variable in size. For example, the track information of the present invention can be recorded within the maximum thirty-one sectors of a cluster (the TDDS is recorded at the remaining one sector of the cluster). However, in case the track information need not be recorded in the entire thirty-one sectors at a specific time (specifically, at an initial recording), necessary track information is recorded and the type of the track information is then represented through the track information list terminator 33. Therefore, any system confusion can be prevented and, if necessary, other useful management information can be recorded to the spare area(s).

Accordingly, as the management information of the disc, the track information (SRR information) 30 includes the header 31, the list of track information (SRR entry list) 32 and the track information list terminator 33, and all these pieces of information are recorded collectively at every updating. Other information, as needed, can be recorded as part of the track information 30.

The list of track information 32 will be described below in more detail.

The list of track information (SRR entry list) 32 includes a plurality of entries 34, each entry corresponding to one track (one SRR) within the disc and assigned to 8 bytes. This entry 34 is also referred to herein as a track information entry or an SRR entry. Each track information entry 34 includes a first status area/field (Status1) 35, a first location area/field 36 for carrying first address information of the corresponding track, a second status area/field (Status2) 37, and a second location area/field 38 for carrying last address information in which data is recorded on the corresponding track. The first location field 36 carries the start PSN of the corresponding track, and the second location field 38 carries the LRA of the corresponding track.

As an example, bits b63~b60 are allocated to the first status field 35, bits b59~b32 are allocated to the first location field 36, bits b31~b28 are allocated to be the second status field 37, and bits b27~b0 are allocated to the second location field 38. Depending upon the need and standardization, the present invention covers different sizes and other ways of allocation for these fields of entries 34.

The first and/or second status fields 35 and 37 carry status information including, but not limited to, the type of the corresponding track (track or SRR status) and session information relating to a session of the disc. As a result, the type of the corresponding track can be determined from the status information. The session information is information representing the location of a session where the corresponding track is located. In addition, the location of the corresponding track can be determined from the location fields 36 and 38.

Accordingly, the system can check whether the specific area of the disc is a recordable area or a session closed area by accessing the track information entries. If a track information entry 34 is read out, the type of the corresponding track, the start location and the LRA of the track can be determined and/or verified accurately. Further, the session information within the track can be acquired.

In this manner, the session information as well as the information on the types of the tracks are recorded together. Therefore, unlike the related art, the session information that the host or the user can utilize is represented without allocating an additional physical area on the disc, thereby improving greatly the efficiency of the disc use. The recording of the session information without any allocation of the physical area can be named as a "virtual session" or "session logical information".

Figure 4:
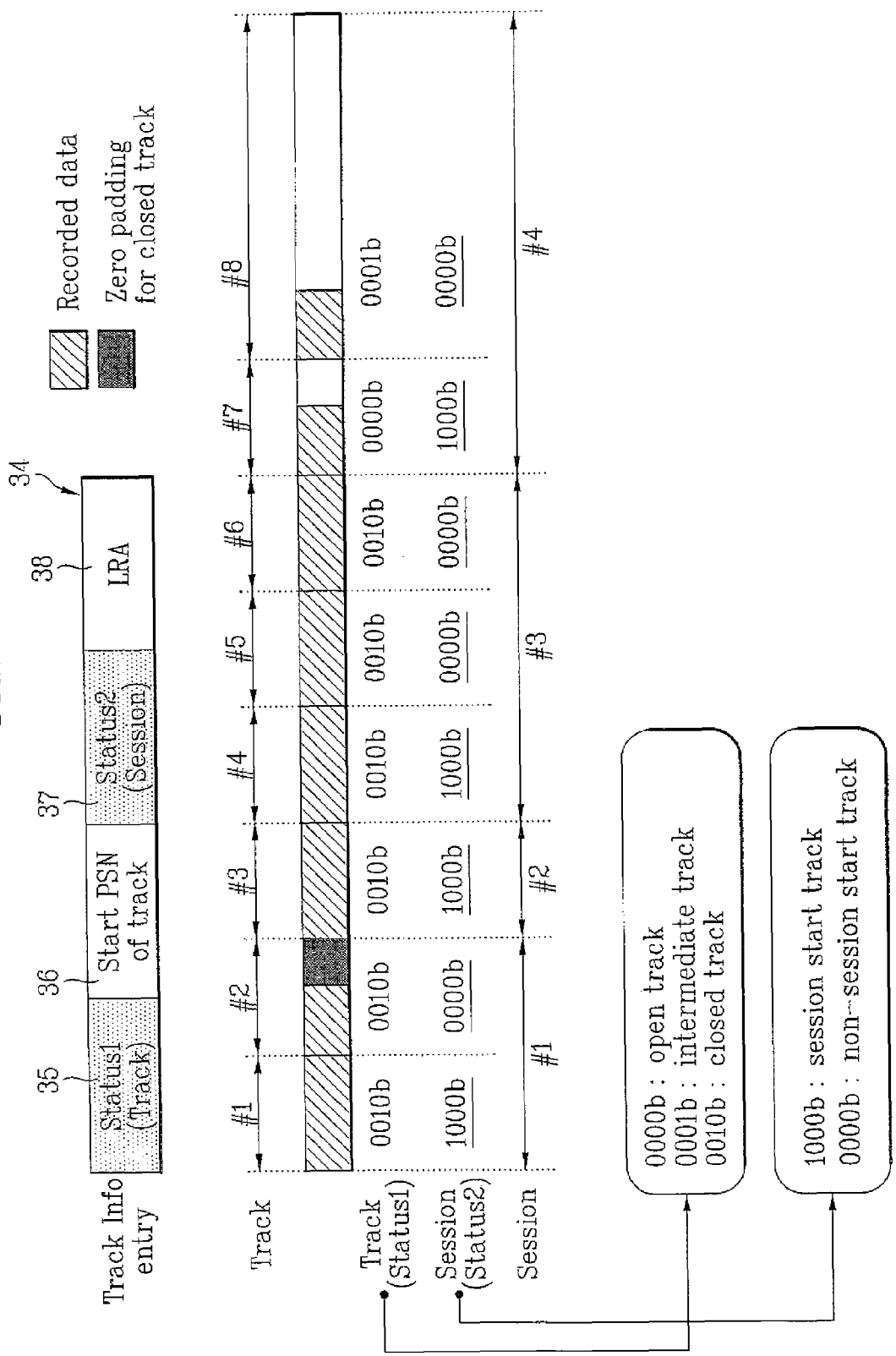
FIG. 4 illustrates a method for recording track information on the write-once optical disc of FIG. 3 according to a first embodiment of the present invention.

FIG. 4 illustrates an example of the structure of a track information entry 34 within the track information of a write-once optical disc such as a BD-WO according to a first embodiment of the present invention. Referring to FIG. 4, in this example, a plurality of tracks (Tracks #1 to #8) exist on the disc. Each track is distinguished from each other by the track status information in the first status field (Status1) 35 that indicates the type of the corresponding track according to definitions. In addition, the second status field (Status2) 37 stores therein session status information indicating whether or not the corresponding track is the start of a session. That is, information indicating the location of a start of a session associated with the track is recorded as the session status information in the Status2.

As an example, the track status information in the Status1 can be represented with "0000b" to indicate an open track, "0001b" to indicate an intermediate track, and "0010b" to indicate a closed track. Each session status information in the Status2 is distinguished from each other by allocating "1000b" to the respective session start tracks, and "0000b" to non-session start tracks, respectively. In FIG. 4, each of Sessions #1, #2 and #3 can be defined as the closed session that starts and ends with the closed track. Session #4 can be defined as the open session that starts with the open track (Track #7) and is not closed yet. According to the above definition, the recording on the closed session is impossible and only the reproduction of the corresponding session is possible. Further, the open session will be a recordable session.

If a close session command to close a specific session is issued, the open tracks existing within the open sessions are all changed into the closed tracks and the information on the type of the tracks is also changed to indicate the closed status of the tracks. For example, although Track #2 of Session #1 is an open track at first, the zero padding (dummy padding) is applied to the recordable area of this track by the close command (e.g., a close track command or a close session command), thereby changing Track #2 into a closed track. As a result, Session #1 is changed from an open session to a closed session that ends with the closed track, Track #2. In a specific system, only the track status information on the type of the tracks can be changed into "0010b" to indicate a closed track without the zero padding applied to the track.

In the example of FIG. 4, since all of Tracks #1 to #6 are closed tracks, their track status information in the Status1 indicates "0010b". However, Tracks #1, #3 and #4 among them are respectively the start tracks of Sessions #1, #2 and #3, respectively, and as such, their session status information in the Status2 indicates "1000b". Tracks #2, #5 and #6 are non-session start tracks, so that their session status information in the Status2 indicates "0000b". Since Track #7 is an open track, its track status information in the Status1 indicates "0000b". Track #7 is also the start track of Session #4, so that its session status information is "1000b". Since Track #8 is an intermediate track, its track status information in the Status1 indicates "0001b". In addition, since Track #8 is not the start track of a session, its session status information in the Status2 indicates "0000b". In this case, Session #4 that is not closed can be defined as the open session.

In the embodiment of FIG. 4, the session status information stored in the Status2 37 can be indicated with a single bit. For instance, a bit having a value "1" can mean a session start track, and a bit value "0" can mean a non session-start track, or vice versa. This one bit can be any bit allocated to the second status field 37. Similarly, any two adjacent bits can be allocated to indicate the track status information in the first status field 35.

Figure 5:
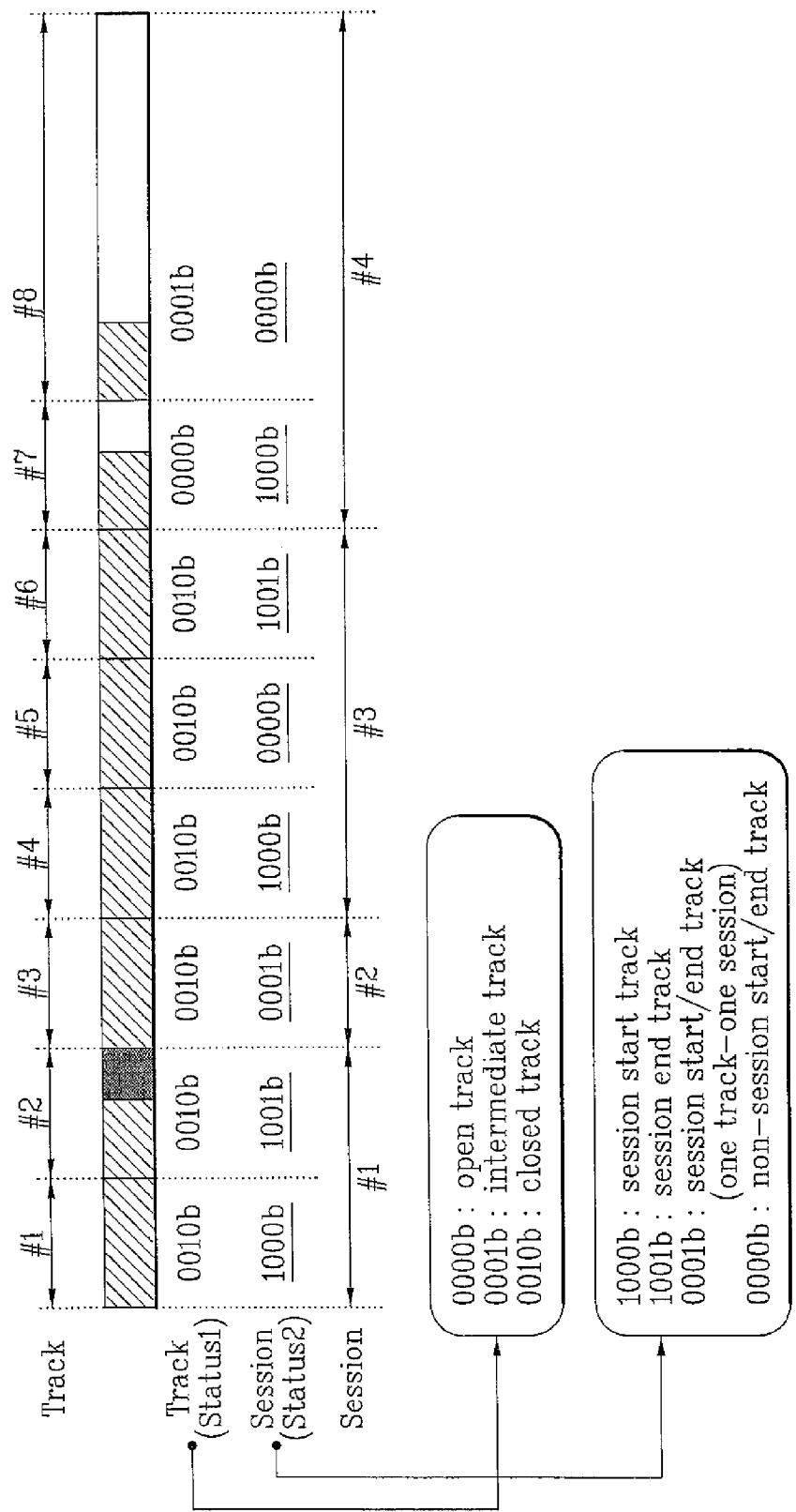
FIG. 5 illustrates a method for recording track information on the write-once optical disc of FIG. 3 according to a second embodiment of the present invention.

FIG. 5 illustrates an example of the structure of a track information entry 34 within the track information 30 of a write-once optical disc such as a BD-WO according to a second embodiment of the present invention. While the first embodiment in FIG. 4 distinguishes the respective tracks using only their start tracks, the second embodiment provides a method for variously distinguishing the tracks with the indications of a session start track, a session end track, a one track-one session, and a non-session start/end track. According to the second embodiment, the session status information recorded within the track information of the present invention can be defined in various manners. In addition, if the session information is needed as standardized information, the session information can be distinguished through its subdivision.

The structure and use of the track information entry 34 in FIG. 5 is identical to those shown in FIG. 4 as discussed above, except for the second status field 37. In the second embodiment, the second status field (Status2) 37 stores session status information that can indicate four different statuses of the corresponding track associated with the entry 34. Accordingly, the structure and use of the second status field 37 will now be provided and the discussion of the identical parts will be omitted.

Referring to FIG. 5, Tracks #1, #4 and #7 are respectively the start tracks of Sessions #1, #3 and #4 and thus, their session status information in the Status2 37 indicates "1000b". Tracks #2 and #6 are respectively the session end tracks of Sessions #1 and #3, so that their session status information in the Status2 37 indicates "1001b". Track #3 is the session start/end track so that its session status information in the Status2 37 is "0001b". This means one track-one session (one track for one session) so that the one track is both the start and end track. Tracks #5 and #8 are middle tracks (non-session start/end tracks), so that their session status information in the Status2 37 indicates "0000b". Accordingly, in case that each session ends with the closed track, it can be defined as the closed sessions (e.g., Sessions #1, #2 and #3). In case each session does not end with the close track or does not have the session end track, it can be defined as the open session (e.g., Session #4).

In the embodiment of FIG. 5, a different number of bits can be allocated to indicate the session status information stored in the Status2 37. Similarly, any two adjacent bits can be allocated to indicate the track status information in the first status field 35.

Figure 6:
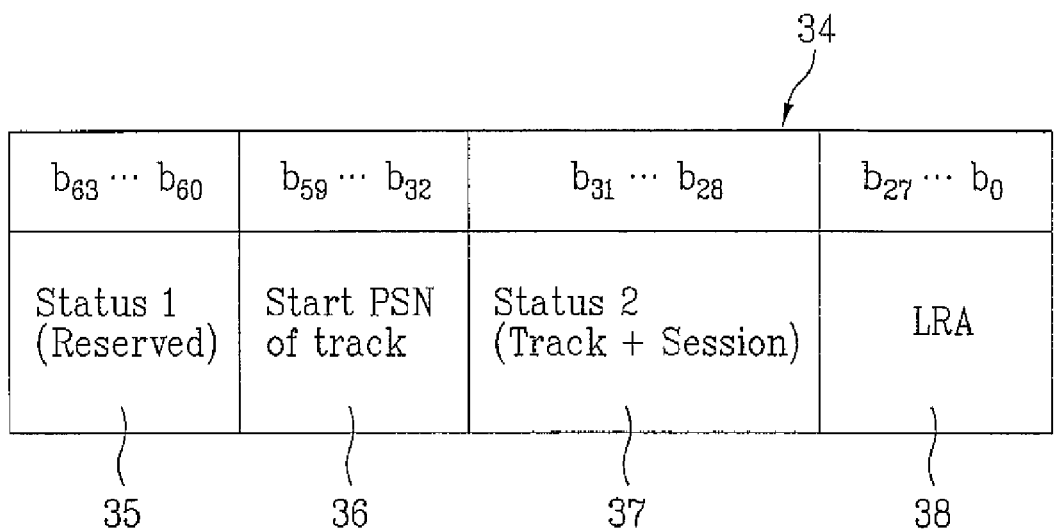
FIG. 6 illustrates a method for recording track information on the write-once optical disc of FIG. 3 according to a third embodiment of the present invention.

FIG. 6 illustrates an example of the structure of a track information entry 34 within the track information 30 of a write-once optical disc such as a BD-WO according to a third embodiment of the present invention. The structure and use of the track information entry 34 in FIG. 6 is identical to those shown in FIG. 4 as discussed above, except for the structure and use of the first and second fields 35 and 37. The structure and use of other fields 36 and 38 are identical to those of FIG. 4.

In the embodiment of FIG. 6, the first status field (Status1) 35 is reserved and the second status field (Status2) 37 stores therein the session status information. The session status information can be indicated with a single bit. For instance, in the Status2, a bit having a value "1" can mean a session start track and a bit value "0" can mean a non session-start track. Any single bit of the Status2 can carry this session status information. For instance, the first bit (b31) of the Status2 37 can carry the session status information. Any unused bits of the Status2 can be reserved for any other use.

In another variation, the Status2 in FIG. 6 can store therein both the session status information and the track status information, and the Status 1 can be reserved for any other use. In this case, as an example, the first bit (b31) of the Status2 can carry the session status information, and the remaining three bits (b30-b28) of the Status2 can carry the track status information as discussed above in FIG. 4.

Figure 7:
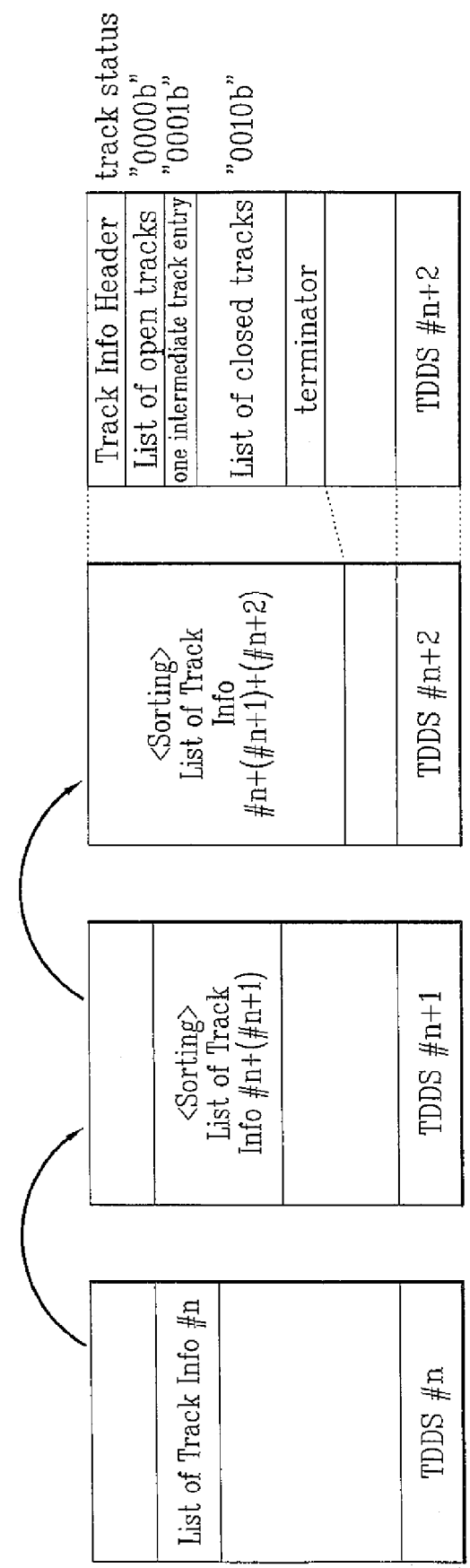
FIG. 7 illustrates a method for updating track information on a write-once optical disc according to the present invention.

FIG. 7 illustrates a method for updating the track information of the write-once disc of FIGS. 3-6 according to an embodiment of the present invention.

Here, since the write-once optical disc has a special characteristic of one-time recording, the status information indicating the recorded status of a specific area in the disc is always necessary. Therefore, the "updating of the track information" means the system or the user is allowed to use the track information by updating the track information each time the disc status is changed according to the recording on the disc.

Accordingly, when a new track is created or an existing track is closed, new track information is created so that the updating of the track information is necessary and performed. In addition, when the disc is ejected or the power is turned off, the use of the disc is paused. Therefore, in this case, the updating of the track information is also necessary and performed since the track information of a final status must be updated in order to accurately check the recorded status of the disc in the next use of the disc.

According to the method of FIG. 7, the track information of a previous stage and the current track information to be updated are cumulatively recorded together, and a list of track information is sorted and recorded in a specific sequence on the disc. Specifically, in order to record an (n+1)-th track information during the updating process, a previously recorded (n)-th track information is first checked. Then, the (n)-th recorded track information and the current (n+1)-th track information are considered as one list of the track information, such that they are sorted and recorded in a specific sequence. In the same manner, in order to record an (n+2)-th track information to be updated, the previously recorded (n+1)-th track information is first checked. Then, the recorded (n+1)-th track information and the current (n+2)-th track information to be updated are considered as one list of the track information, so that they are sorted and recorded in a desired sequence.

As an example only, the sorting can be according to the track status information indicating the type of the track, and then further based on the first address information (Start PSN) of the track. Other sorting schemes are possible.

Herein, in case the sorting of the list of the track information according to the above example is applied to the present invention, the sorted status at the (n+2)-th updating is now discussed. First, the open track whose information on the type of the track is "0000b" is sorted. Next, only one intermediate track whose information on the type of the track is "0001b" is sorted and the general closed track whose information on the type of the track is "0010b" is sorted. In case the type of one track is equal to the type of the comparing track, the track whose first address information of the track is most leading is sorted preferentially. However, with regard to the sorting, a bit arrangement allocated as the information on the type of the track and a reference of the sorting are a matter of selection and a variety of methods can be applied according to the system or designer.

The method of updating the track information according to the present invention, in which the sorting is performed including the previous track information, has an advantage in that all tracks existing within the disc are sorted according to the type of the tracks. Therefore, the desired information on the type of the tracks can be easily acquired. In addition, all track information of the previous stages can be checked at a time by referring to the latest track information updated last, thereby reducing the access time.

Figure 8:
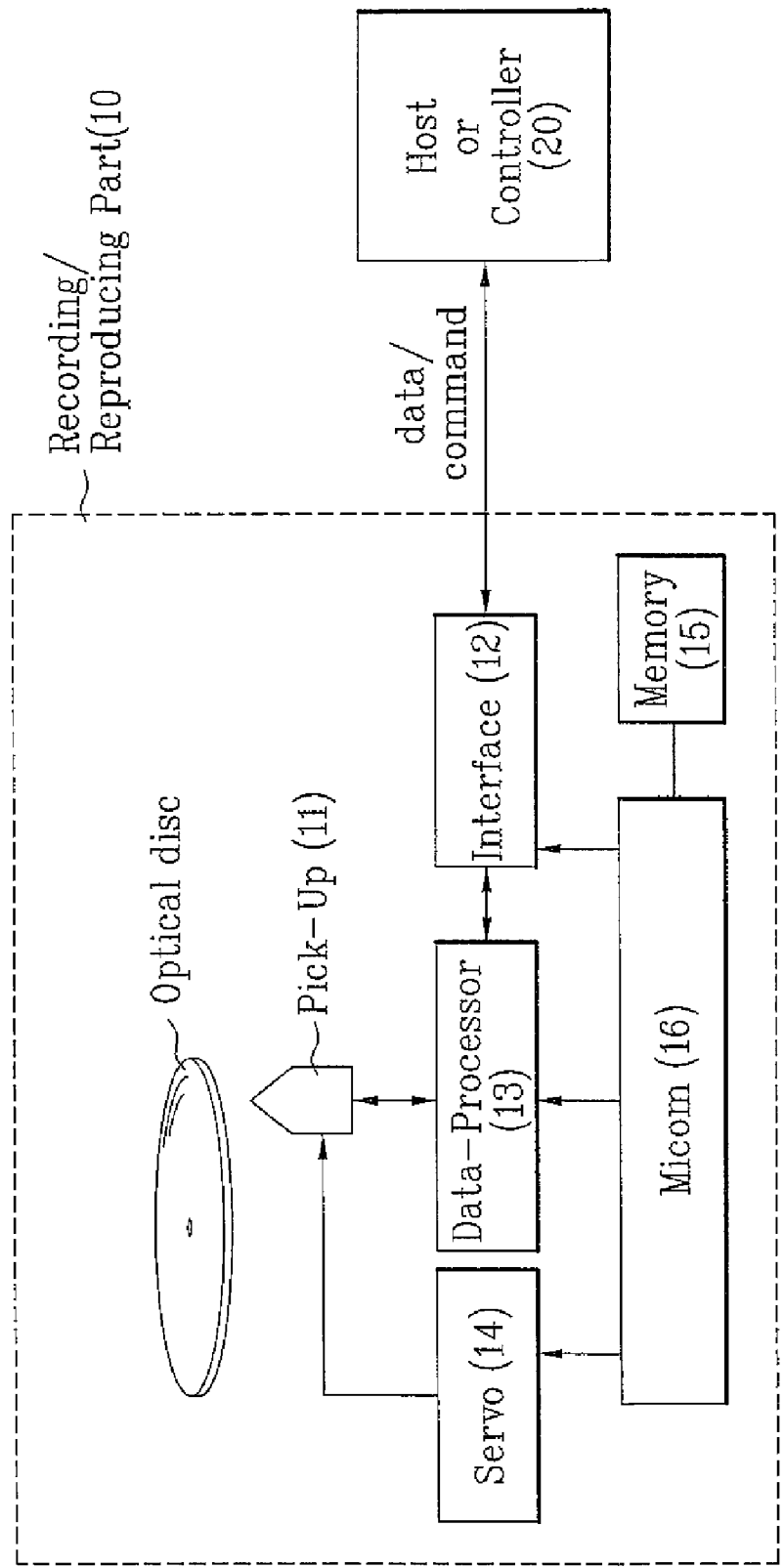
FIG. 8 illustrates a recording/reproducing apparatus for a write-once optical disc according to the present invention.

FIG. 8 illustrates a recording/reproducing apparatus in which the present method of recording, managing and/or updating the disc status information of the disc as discussed above is implemented. The present methods and disc structures, however, can be implemented in other types of devices or systems.

As shown in FIG. 8, the apparatus of the present invention includes a recording/reproducing part 10 for recording/reproducing information on/from an optical disc such as a write-once optical disc, e.g., BD-WO, and a control part 20 for controlling the recording/reproducing part 10. The control part 20 issues a command for recording or reproducing information on or from a specific area of the recording/reproducing part 10. Specifically, the recording/reproducing part 10 includes: an interface unit 12 for allowing communication with external devices such as the control part 20; a pickup unit 11 for recording or reproducing data on or from the optical disc; a data-processor 13 for receiving a reproduction signal from the pickup unit 11 to restore it into a desired signal value, or for modulating a to-be-recorded signal into a signal to be recorded on the optical disc; a servo unit 14 for accurately reading out the signal from the optical disc, or controlling the pickup unit 11 to accurately record the signal on the optical disc; a memory 15 for temporarily storing information, including the management information, and data; and a microprocessor 16 for controlling the components of the recording/reproducing part 10. All the elements of the recording/reproducing apparatus are operatively coupled.

Herein, the recording/reproducing process of the optical disc according to the present invention will be described in detail. First, if an optical disc such as a BD-WO is loaded into the recording/reproducing apparatus of FIG. 8, the latest track information recorded on a preset management area of the optical disc is read out and temporarily stored in the memory 15 of the recording/reproducing part 10. The microprocessor 16 controls the recording and updating of the track information and other management information. In addition, since the latest used status of the disc is recorded within the track information of the disc, the start address information of the specific track, the LRA and the session information of the specific portion within the disc are read out, and the recording or non-recording status and the start/end of the session in the specific area can be checked from the read-out information. This information can then be used to record/reproduce data on/from the optical disc.

In case it is necessary to record or reproduce information on or from the specific area of the optical disc, the control part 20 transmits this information as the recording/reproducing command to the recording/reproducing part 10 together with the location information of the specific area where the recording is desired. After the microprocessor 16 of the recording/reproducing part 10 receives the recording command, the control part 20 can accurately check the recorded status of the specific area within the disc, where the recording is desired, from the track information stored in the memory 15. Accordingly, it is possible to perform the recording/reproducing command desired by the control part 20 or any other device.

According to the method of recording the management information on the write-once optical disc of the present invention, the track information can be recorded on the write-once optical disc in which the physical defect management is performed. In addition, because the session information is recorded within the track information of the disc, allocation of an additional physical area is not needed and the compatibility with the existing reproduction-only standard can be maintained. Further, using the disc structure and the sorting method of the present invention, it is possible to efficiently update the track information. As a result, it is possible to efficiently manage the management information even in the write-once optical disc having a new and different physical structure.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A recording medium having at least one recording layer, the recording medium including a plurality of recording-units where data is sequentially recorded, the recording medium comprising:
a session including at least one recording-unit; and
a temporary defect management area for storing therein management information until the recording medium is finalized, the management information including recording-unit information, the recording-unit information pertaining to the plurality of recording-units and including a recording-unit entry list, the recording-unit entry list including a plurality of recording-unit entries, each recording-unit entry pertaining to a recording-unit and including a session status field to store session start information indicating whether the pertaining recording-unit is a start of the session, a start address field indicating where the pertaining recording-unit starts, and a last recorded address field storing the last recorded address of the pertaining recording-unit,
wherein the session status field is located between the start address field and the last recorded address field, and
wherein when the recording medium is finalized, latest management information recorded in the temporary defect management area is recorded in a defect management area of the recording medium.

2. The recording medium of claim 1, wherein the session status field includes one bit assigned to carry the session start information.

3. The recording medium of claim 1, wherein the session status field further stores therein recording-unit status information indicating whether the pertaining recording-unit is opened or closed.

4. The recording medium of claim 1, wherein the each recording-unit entry includes a recording-unit status field for storing therein recording-unit status information, and the recording-unit status area is located at the beginning bits of the each entry.

5. The recording medium of claim 4, wherein the recording-unit status information indicates whether the pertaining recording-unit is opened or closed.

6. The recording medium of claim 1, wherein the recording-unit information further includes a header, and the header includes a list of opened recording-units for locating each opened recording-unit exiting on the recording medium and a total number of the recording-units.

7. The recording medium of claim 1, wherein the recording-unit information is stored in a temporary defect management area designated on the at least one recording layer.

8. The recording medium of claim 1, wherein the recording medium is a write-once optical disc.

9. A method for recording management information on a recording medium having at least one recording layer, the recording medium including a plurality of recording-units where data is sequentially recorded, the method comprising:
(a) recording management information in a temporary defect management area of the at least one recording layer until the recording medium is finalized, the management information including recording-unit information, the recording-unit information pertaining to the plurality of recording-units and including a recording-unit entry list, the recording-unit entry list including a plurality of recording-unit entries, each recording-unit entry pertaining to a recording-unit and including a session status field to store session start information indicating whether the pertaining recording-unit is a start of a session formed by at least one recording-unit, a start address field indicating where the pertaining recording-unit starts, and a last recorded address field storing therein the last recorded address of the pertaining recording-unit, wherein the session status field is located between the start address field and the last recorded address field; and (b) recording latest management information recorded in the temporary defect management area onto a defect management area of the recording medium when the recording medium is finalized.

10. The method of claim 9, wherein the session status field includes one bit assigned to carry the session start information.

11. The method of claim 9, wherein the recording step (a) further includes:

(a1) storing recording-unit information into the session status field, the recording-unit information indicating whether the pertaining recording-unit is opened or closed.

12. The method of claim 9, wherein the recording step (a) further includes:

(a1) storing recording-unit information into a recording-unit status field of the pertaining recording-unit entry, the recording-unit status field being located at the beginning bits of the each recording-unit entry.

13. The method of claim 12, wherein the recording-unit information indicates whether the pertaining recording-unit is opened or closed.

14. The method of claim 9, wherein the recording-unit information further includes a header, and the header includes a list of opened recording-units for locating each opened recording-unit existing on the recording medium and a total number of the recording-units.

15. The method of claim 9, wherein the recording step (a) the recording-unit information is recorded into a temporary defect management area designated on the at least one recording layer.

16. The method of claim 9, wherein the recording medium is a write-once optical disc.

17. An apparatus for recording management information on a recording medium having at least one recording layer, the recording medium including a plurality of recording-units where data is sequentially recorded, the apparatus comprising:

an interface configured to communicate with an external device;

a pickup configured to record/reproduce data to/from the recording medium;

a data processor configured to receive and restore a reproduction signal from the recording medium, and modulate a signal proper to the recording medium;

a servo configured to control the pickup to accurately read/record data signal from/to the recording medium;

a memory configured to store therein data temporarily; and a microcomputer operatively coupled to above components—the interface, the pickup, the data processor, the servo and the memory—and configured to control the components so that the apparatus records management information in a temporary defect management area on the at least one recording layer until the recording medium is finalized, the management information including recording-unit information, the recording-unit information pertaining to the plurality of recording-units and including a recording-unit entry list, the recording-unit entry list including a plurality of recording-unit entries, each recording-unit entry pertaining to a recording-unit and including a session status field for storing therein session start information indicating whether the pertaining recording-unit is a start of a session formed by at least one recording-unit, a start address field indicating where the pertaining recording-unit starts, and a last recorded address field storing therein the last recorded address of the pertaining recording-unit, wherein the session status field is located between the start address field and the last recorded address field, and the microcomputer configured to control the components so that the apparatus records latest management information recorded in the temporary defect management area onto a defect management area of the recording medium when the recording medium is finalized.

18. The apparatus of claim 17, wherein the session status field includes one bit assigned to carry the session start information.

19. The apparatus of claim 17, wherein the session status field includes recording-unit status information indicating whether the pertaining recording-unit is opened or closed.

20. The apparatus of claim 17, wherein the each recording-unit entry includes a recording-unit status field for storing therein recording-unit status information, and the recording-unit status area is located at the beginning bits of the each entry.

21. The apparatus of claim 20, wherein the recording-unit information indicates whether the pertaining recording-unit is opened or closed.

22. The apparatus of claim 17, wherein the recording-unit information further includes a header, and the header includes a list of opened recording-units for locating each opened recording-unit existing on the recording medium and a total number of the recording-units.

23. The apparatus of claim 17, wherein the apparatus records the recording-unit information onto a temporary defect management area designated on the at least one recording layer.

24. The apparatus of claim 17, wherein the recording medium is a write-once optical disc.

25. The apparatus of claim 17, further comprising:

a host configured for issue to the microprocessor a command for recording/reproducing information on/from the recording medium.

26. An apparatus for recording management information on a recording medium having at least one recording layer, the recording medium including a plurality of recording-units where data is sequentially recorded, the apparatus comprising:

a pickup configured to record/reproduce data to/from the recording medium; and a microcomputer, operatively coupled to the pickup, configured to include a module configured to control the pickup to record management information in a temporary defect management area on the at least one recording layer until the recording medium is finalized, the management information including recording-unit information, the recording-unit information pertaining to the plurality of recording-units and including a recording-unit entry list, the recording-unit entry list including a plurality of recording-unit entries, each recording-unit entry pertaining to a recording-unit and including a session status field for storing therein session start information indicating whether the pertaining recording-unit is a start of a session formed by at least one recording-unit, a start address field indicating where the pertaining recording-unit starts, and a last recorded address field storing therein the last recorded address of the pertaining recording-unit, wherein the session status field is located between the start address field and the last recorded address field, and the microcomputer configured to control the pickup to record latest management information recorded in the temporary defect management area onto a defect management area of the recording medium when the recording medium is finalized.

* * * * *